United States Patent [19]
Deaton

[11] Patent Number: 5,092,056
[45] Date of Patent: Mar. 3, 1992

[54] REVERSED LEAF SPRING ENERGIZING SYSTEM FOR WELLBORE CALIPER ARMS

[75] Inventor: John G. Deaton, Houston, Tex.

[73] Assignee: Halliburton Logging Services, Inc., Houston, Tex.

[21] Appl. No.: 404,546

[22] Filed: Sep. 8, 1989

[51] Int. Cl.$^5$ .................. G01B 5/08; G01B 7/12; E21B 47/08; G01V 3/18

[52] U.S. Cl. .................. 33/544; 33/544.3

[58] Field of Search .................. 33/544, 555.1, 555.2, 33/542, 544.2, 544.3, 542.1, 544.5; 73/784; 166/241; 267/40, 260

[56] References Cited

U.S. PATENT DOCUMENTS

| | | | |
|---|---|---|---|
| 1,235,703 | 8/1917 | Larson | 267/40 |
| 2,102,080 | 12/1937 | Kinley | 33/544 |
| 2,582,719 | 1/1952 | Ramsey | 166/241 |
| 2,864,173 | 12/1958 | Castel | 33/544.2 |
| 3,356,146 | 12/1967 | Anderson | 166/241 |
| 3,685,158 | 8/1972 | Planche | 33/544.3 |
| 3,977,468 | 8/1976 | Brewer et al. | 166/241 |
| 4,130,816 | 12/1978 | Vogel et al. | 166/241 |
| 4,243,099 | 1/1981 | Rodgers, Jr. | 166/66.4 |
| 4,563,757 | 1/1986 | Decorps et al. | 367/33 |
| 4,588,951 | 5/1986 | Ohmer | 324/367 |
| 4,614,250 | 9/1986 | Panetta et al. | 181/102 |

*Primary Examiner*—William A. Cuchlinski, Jr.
*Assistant Examiner*—C. W. Fulton
*Attorney, Agent, or Firm*—William J. Beard

[57] ABSTRACT

A caliper tool mechanism is set forth. In the preferred and illustrated embodiment, a pair of opposing caliper arms are pivotally mounted on a elongate body and are recessed in elongate slots in said body. The caliper arms are retracted to a parallel position. The arms extend parallel to the elongate body and cover an elongate leaf spring. The spring has a fastened lower end affixed to the lower end of the body, and upper ends joined through moveable lengths to said caliper arms.

4 Claims, 2 Drawing Sheets

REVERSED LEAF SPRING ENERGIZING SYSTEM FOR WELLBORE CALIPER ARMS

BACKGROUND OF THE DISCLOSURE

The present disclosure is directed to a caliper arm mounting system and in particular a leaf spring construction for positioning between the caliper arm and the body of a caliper tool for obtaining borehole diameter measurements. In particular, the present apparatus is directed to a leaf spring system installed between a caliper arm and the tool body to thereby define a system which does not unreasonably extend the length of the tool body, to further define a spring system which can be either strengthened or weakened by selective addition of leaves therein, and to otherwise provide a very narrow structure when the arms are retracted and yet a structure which is able to operate in dynamic situations as the arms deflect inwardly and outwardly.

The leaf spring of the present disclosure tapers from one end to the other. One end is quite thick, being formed by a stack of leaves which register at the end. A fastening device is used to fasten that end of the leaf spring system against the elongate body which supports the arms; the opposite end is relatively thin, this resulting from fabrication of the spring system from multiple leaf springs. They are selected or sized so that the spring force is controlled. In addition to that, the leaf springs are constructed so that, in conjunction with the fastening device, they are parallel to the elongate body supporting the caliper arms. This parallel position enables nesting or recessing of the leaf spring in an energized state sandwiched between the body and the retracted caliper arm. On the other hand, the arm extension can be accomplished quite readily by spring power when the retracting force is removed through a pivotal link mechanism actuated by a motor unit. This enables the tip of the deflected caliper arm to ride against the wall of the borehole and thereby obtain measurements of borehole diameter. In ordinary application, two such arms are deployed opposite one another into contact with the surrounding borehole and thereby provide caliper measurements.

The present apparatus is summarized as an improved caliper arm mounting system which provides a type of leaf spring operatively connected between caliper arms and an elongate body which makes up the caliper tool. For a given arm, the arm is supported at its upper end by mounting on a pivot point and has a bell crank appended thereto to the connected measuring device. The arm is mounted so that it can retract into a flush position adjacent an elongate tubular body. Captured between the arm and the body is an elongate leaf spring which, when retracted, is parallel to the adjacent arm and adjacent body. The arm is positioned so that a connective link pivotally joins to the arm at one end of the leaf spring. The opposite end of the leaf spring is clamped to and parallel with the body and is recessed, so to speak, for alignment with the arm and leaf spring. Multiple independently operated arms are incorporated on the device.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
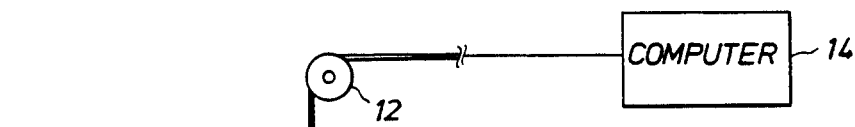
FIG. 1 shows a borehole caliper tool in accordance with the teachings of the present disclosure suspended in a borehole with arms extended outwardly to make caliper measurements.

Attention is now directed to FIG. 1 of the drawings which shows a caliper tool in accordance with the teachings of the present disclosure which is suspended in a well borehole. The caliper tool 10 is supported on a logging cable 11 which extends upwardly to the surface and passes over a sheave 12. The logging cable encloses one or more lengthwise electrical conductors for providing signals to and from the caliper tool 10 and surface located equipment. The logging cable 12 extends to a truck 14 which is represented in symbolic form. The truck normally includes a large drum or reel for the cable. The cable connects with suitable power supplies for operation of the downhole equipment which is electrically powered. Moreover, the truck incorporates a recording device, and means for providing control signals to the caliper tool 10. In addition to that, an electrical or mechanical depth measuring system is typically connected to the sheave 12 and provides an output signal indicative of the precise depth of the caliper tool 10 in the well borehole so that depth measurements can be obtained.

The logging tool additionally includes equipment believed to be well known to those of average skill in the art for causing the caliper arms to deflect, and to measure that deflection and convert deflection into borehole diameter. More specifically, the device uses a pair of opposite arms 15 and 16 shown in FIG. 1 to obtain a borehole diameter measurement.

Figure 2:
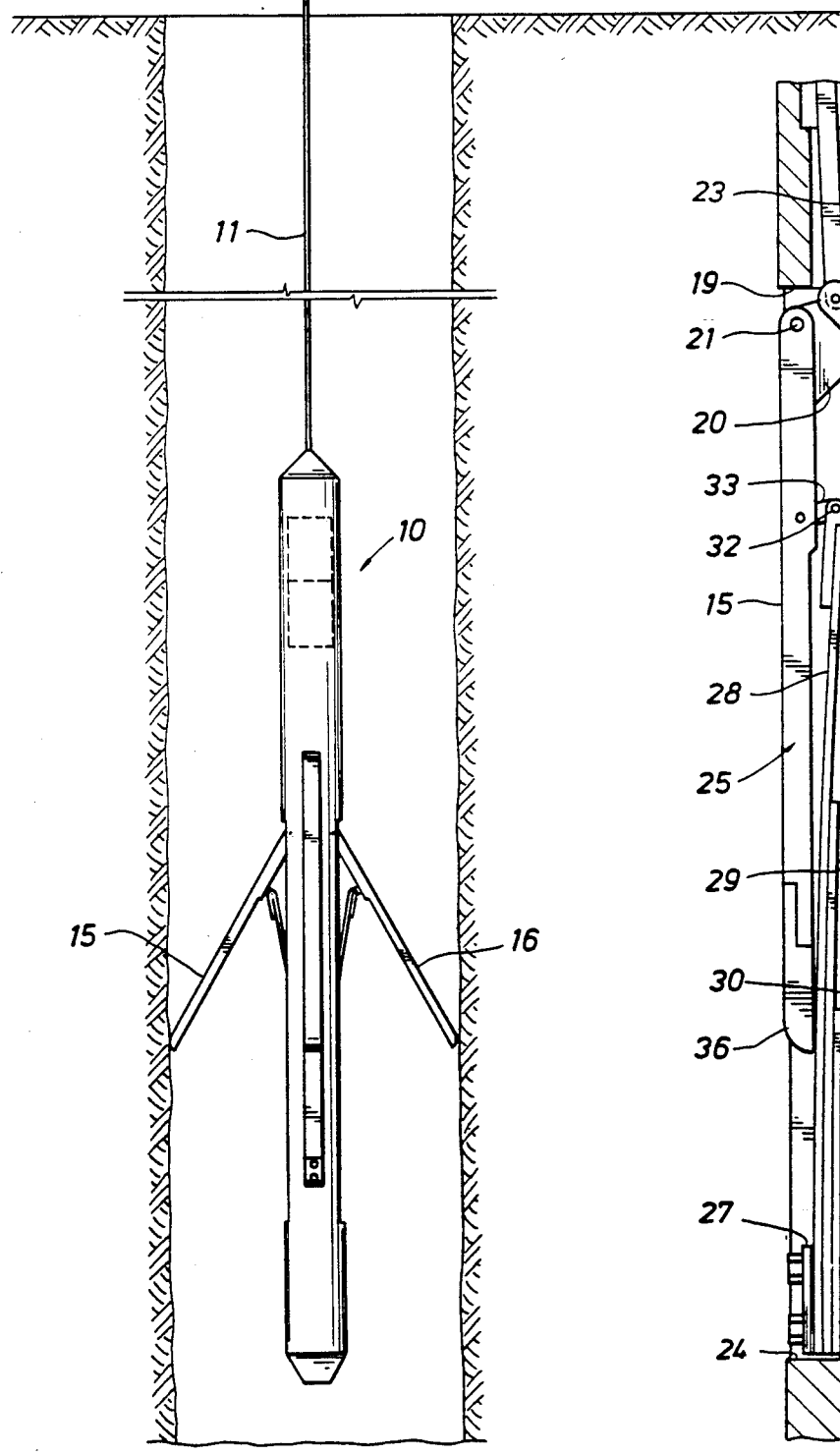
FIG. 2 is an enlarged detail view taken along a sectional cutline through the apparatus of FIG. 1 and in particular discloses details of construction of the pivot mounting for the arms parallel to the respective mounting springs adjacent to the body.

Details of construction can be understood better on reference to FIG. 2 of the drawings. There, the caliper tool 10 is shown to have an upper body portion 18. The body portion 18 is an elongate cylindrical member which has a number of windows cut in it. There is a lengthwise window formed below the shoulder 19 to receive the caliper arm 15. The window is traversed by a fastening pin 21. The pin 21 supports the arm 15 and also supports an appended bell crank 20 which extends to the side. The bell crank in turn connects with an elongate push rod 22, the two being connected at a pin connection. The push rod 22 is connected to a resistive means (not shown) well known in the art for resisting the force applied via the bell crank 20 and which force causes the arm to rotate toward the closed position. Moreover, the position of the push rod is measured and that measurement is converted into the angular deflection of the arm. The trigonometric relationship between arm length and angle of rotation is calibrated relative to the position of the push rod. With this calibration, the push rod can thereby be measured to obtain tip locations so that borehole diameter can be measured with the pair of opposing arms. Thus, the arms 15 and 16 extended in FIG. 1 measure the width of the borehole at a particular location. That measurement is obtained by the lengthwise translation of the two respective push rods, and such measurements are made in the customary fashion. Push rod translation is therefore indicative of borehole diameter.

Figure 3:
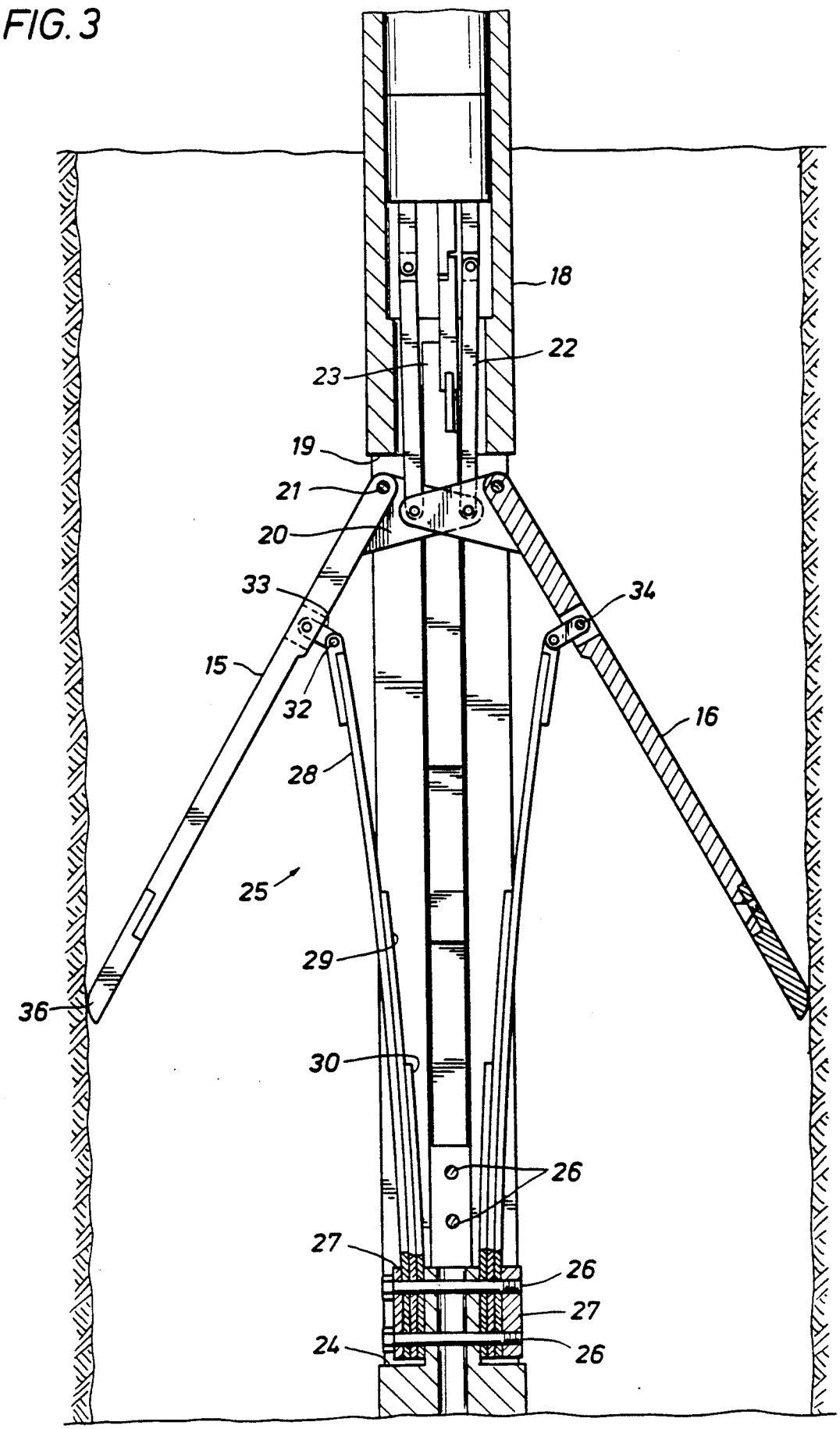
FIG. 3 is a view similar to FIG. 2 showing the arms deflected outwardly and which are resiliently urged against the borehole by the leaf springs of the present disclosure.

FIG. 3 is more useful in understanding the equipment because it shows the arms spread open as a result of leaf spring operation. FIG. 3 shows an additional arm 23 which is deployed for extension in a perpendicular plane to the drawing; there are deep grooves cut into the tool body which form an X when viewed in cross section so that slots cut entirely through the body. This is shown in the drawings so that there is room to receive the respective arms 15, 16 and 23 in the fully retracted position. At the left side of FIG. 3, there is a lengthwise slot which extends from the upper shoulder 19 to the lower shoulder 24. This slot receives the arm 15 which is shorter than the slot. The arm 15 has a recessed position which is parallel to the axis of the body (see FIG. 2) and is positioned so that it will overlay the spring assembly 25. The spring assembly comprises an individual spring assembly for each arm; the preferred embodiment utilizes four arms and hence uses four spring assemblies which are identical in construction and which differ only in position.

Going now to details of the spring assembly, two duplicate spring assemblies are fastened by long bolts 26 at duplicate parallel locations though the body, the bolts fastening clamp bars 27, and the clamp bars securing stacked leaf members. The threaded connection achieved for the spring means 25 secures the multiple leaves of the spring assembly together. A long leaf 28 is included which extends the full length of the spring assembly; the assembly can be formed with one or more long leaves. An intermediate leaf 29 is shown and a shorter leaf 30 is also shown. While three are shown in the drawings, the construction can vary so that the number of leaves can be varied to a number which is larger or smaller as required. Moreover, the several leaves are stacked so that they all anchor at the fastening means shown at the lower parts of FIGS. 2 and 3. They are stacked and joined together at the lower end by the bolts 26. Collectively, they form a tapered spring which has the classic shape of a leaf spring so that a spring force is applied which is variable depending on angle of deflection. The springs are biased with curving construction which is overcome by arm retraction.

The outer tip of the leaf 24 supports a yoke thereon, and that in turn incorporates a pin 32 which is fastened to a connective link 33 and the link 33 is supported by a suitable pin 34 in the arm. The link is received in a transverse opening formed through the arm so that direct connection is made for imparting a resilient force to the arm.

The arm is of substantial length extending from the pivot pin 21 which anchors one end of the arm. The lower or free end 36 incorporates a sacrificial tip which can be removed and replaced in the event of wear. This assures that the arm tip is serviced and replaced, meaning the arm tip that is forced outwardly. A force is supplied by the motor mechanism through the push rod to keep the arm in its closed (recessed) position prior to operation. This force is removed to initiate the caliper operation which allows the leaf spring force to deflect the arm outwardly. As the arm moves outwardly, the spring moves toward the relaxed state. The arm is subjected to balanced forces used to maintain the tip of the deflected arm against the well borehole. When the arm is forced radially toward the body, the spring is energized more, at least relatively, and the lengthwise translation of the push rod for the arm is measured to ascertain the location of the outer tip of the arm. Of course, this occurs simultaneously with the opposing arms 15 and 16 and hence, two measurements are necessary (one for each arm) so that the total diameter of the borehole can be determined.

Operation of the spring mounted arms should be considered from the point of view of movement of the arms. FIG. 2 shows the arms in the retracted position. This occurs because the motive force pulls the attached arm back against the body. In FIG. 2, the tool body defines a lengthwise slot or groove which receives the particular arm and associated leaf spring 25. All three members are approximately parallel to one another. The outer tip of the leaf spring 25 may flex slightly inwardly by a modest amount; as shown in the contrast between FIGS. 2 and 3, the leaf spring initiates intimate contact between the arm and the borehole wall during operation until a motive force is used to restore the arms to the retracted position.

An important factor is that the arms are pivotally mounted at the upper end and the lower tips thereof deflect outwardly, coming into contact with the borehole. The tips are moved from the retracted position of FIG. 2 into the extended position of FIG. 3. Moreover, this occurs under control of and subject to the opening forces achieved by the leaf springs 25 for each of the respective arms.

The leaf spring construction enables the springs to recess into the lengthwise slots. It is desirable that the respective leaf spring 25 for each of the arms has a narrow width so that they fit within the slots. Since there are four slots, four such spring assemblies are required. They are all clamped in the same fashion as shown in FIG. 2. Indeed, the bolts shown in FIG. 3 are sufficient to fasten leaf springs on opposite sides. This anchors two of the arm movement mechanisms. An additional pair of mechanisms is located at right angles to those shown in the drawings. They are associated with the arms at right angles to the arms 15 and 16. In this instance, the bolts extending at right angles through the equipment have been omitted from the drawings for sake of clarity; the bolts are located just above or just below the bolts shown in the drawings, and extend transversely across the body of the structure. This assures that there is room to attach fastening means to all four of the springs secured around the body. The arms and springs are offset pairs at the upper end to reduce conflict in operation by the pairs.

Each spring mechanism 25 is constructed so that the energized state is achieved when the attached arm is pulled to the parallel and retracted position. In summary, the springs are loaded with a bias, preferably restoring the arms to the open position. The arms, on the other hand, are forced inwardly by push rod actuation. This deflects the spring mechanism inwardly of the open position. In the spring extended state shown in FIG. 3, retraction is accomplished to the position of FIG. 2 by the borehole wall, thereby forcing the arm tips radially inwardly.

Operation of the present system is achieved in the following fashion. The caliper tool is lowered in a well borehole with the arms retracted. It is then retrieved up the well with the arms extended. The arms are extended by operation of the leaf springs, which motion is coupled to the respective push rods. Moreover, in the outwardly deflected condition, the arms are brought into contact with the surrounding borehole wall which limits opening. As irregularities in diameter are encountered, the tips of the arms 15 and 16 extended as in FIG. 1 are forced inwardly. The bias force provided by the spring mechanisms 25 is balanced against the force imparted by the borehole wall. Deflection is accomplished from bump to bump so that the deflection feeds through and a caliper measurement is thus recorded. Typically, the caliper measurement is transferred by a suitable telemetry circuit along the logging cable 11 to surface located equipment at 14 for recording. Typically, diameter is measured as a function of depth in the borehole.

The leaf spring construction shown in FIGS. 2 and 3 is especially useful in that it is able to be stored without requiring excessive length; that is, the length of the tool is not exaggerated by the incorporation of the leaf spring construction.

While the foregoing is directed to the preferred embodiment, the scope thereof is determined by the claims which follow:

What is claimed is:

1. A borehole tool for downhole measurement of borehole diameter comprising:
   (a) an elongate body member having four lengthwise slots forming four arm receiving recesses arranged at 90° intervals therearound, and comprising two separate arm receiving recess pairs, said pairs having longitudinally offset locations along said body member, wherein said body is adapted to be raised in a borehole to make measurements in the borehole wherein said body member has upper and lower ends;
   (b) a caliper arm in each of said recesses and having two ends, one end being an upper end joined by a pivot means to said body member, and having a pivotally deflected lower end moveably extending outwardly from said recess to contact the surrounding borehole in making a caliper measurement;
   (c) elongate leaf spring means in each of said recesses and comprising at least one full length leaf spring element and at least two shorter leaf spring elements having aligned lower ends thereof, the upper ends of said leaf springs varying in length, and springs elements being joined collectively at said aligned lower ends by bolt means extending through said aligned lower ends thereof to form said elongate leaf spring means and wherein each of recesses comprises a lengthwise slot longer than said arm and said spring means to enable said arm to fully retract;
   (d) fastening means, comprising bolt means extending through said leaf spring means and said elongate body member, for positioning said springs means parallel to said body member in an energized state wherein said spring means is positioned parallel to and beneath said caliper arm in each of said recesses in the retracted state thereof; and
   (e) connective like means connected between said caliper arm and said spring means at the upper end thereof and remote from said fastening means, said link means deflecting said caliper arm to the opened state wherein said connective link means imparts an opening force to extend the lower end of said arm outwardly from each of said recesses.

2. The apparatus of claim 1 wherein said spring means is:
   (a) straight in a energized state;
   (b) positioned parallel to said body in said recess and in a energized state;
   (c) positioned parallel to said caliper arm in a energized state; and
   (d) sufficient in length to fit between said body and said caliper arm.

3. The apparatus of claim 1 wherein said elongate body encloses a push rod connected with said caliper arm through a bell crank means, and said push rod moves due to deflection of said caliper arm, and wherein the push rod moves to thereby convey caliper arm deflection to said push rod so that said push rod movement is measured.

4. The apparatus of claim 1 wherein the upper end of said leaf spring means is attached by a moveable connective link with said caliper arm, and said upper end deflects away from said body recess during operation, and said leaf spring means tends to move said caliper arm from said recess.

* * * * *